UNITED STATES PATENT OFFICE.

DANIEL DRAWBAUGH, OF EBERLY'S MILL, PENNSYLVANIA.

SUBSTANCE FOR TELEPHONE-ELECTRODES.

SPECIFICATION forming part of Letters Patent No. 568,526, dated September 29, 1896.

Application filed January 10, 1896. Serial No. 575,014. (No specimens.)

*To all whom it may concern:*

Be it known that I, DANIEL DRAWBAUGH, a citizen of the United States, residing at Eberly's Mill, in the county of Cumberland and State of Pennsylvania, have invented certain new and useful Improvements in Substances for Telephone-Electrodes; and I do hereby declare the following to be a full, clear, and exact description of the invention, such as will enable others skilled in the art to which it appertains to make and use the same.

This invention relates to substances for telephone-electrodes.

The object is to present a ready and efficient substitute for the granular carbon now employed in many forms of telephones.

My invention consists in the employment and presentation of platinum in a form in which its conductivity shall have been suitably lowered.

Heretofore platinum has been suggested and tried as an electrode, either in the form of bare pellets of the compact metal or in the form of spongy platinum, but the same has been found to be of too high conductivity for efficient use. By my invention the conductivity of the metal employed, particularly platinum, is suitably lowered. To carry my invention into effect, I take or prepare platinum in the form of platinum-black, agglomerate this into a suitable mass, and then divide it into granules or buttons suitable for telephone-electrodes.

As an illustration of one manner of agglomerating the platinum-black into a suitable mass, I take any desired quantity of platinum-black and mix with this a rubber cement made by dissolving rubber in bisulfid of carbon, the usual proportion of rubber to the bisulfid of carbon being about one-thirtieth, more or less, by weight, of the rubber to the carbon bisulfid, and the quantity of platinum-black to the cement being about in the proportion of four to eight times the amount of platinum-black, more or less, in bulk to the bulk of the rubber, only so the proper purpose is effected, which is to get a strongly coherent mass of platinum-black without too much of any other substance therewith mixed. After mixing the platinum-black with the cement the mass is suitably dried and thereafter subjected to heat sufficient to render the whole properly brittle and non-elastic, and it is then comminuted or broken up into small particles or granules.

Instead of granulating the mass the same or any portion or portions thereof may be formed into pieces or buttons suitable for the electrodes themselves.

I have found that in the use of platinum-black increased distinctness of articulation results and there will be absence of any break or slurring in the transmission of sound and an entire absence of any packing of the platinum-black.

Having thus described my invention, what I claim, and desire to secure by Letters Patent, is—

1. The method of preparing platinum for use at telephone-electrodes, which consists in taking or preparing platinum in the form of platinum-black, agglomerating this into a suitable mass, and then dividing this mass into granules or buttons, substantially as described.

2. The method of preparing platinum for use at telephone-electrodes, which consists in taking a suitable quantity of platinum-black, mixing this with a suitable cement, drying the mass, subjecting it to the action of heat, and then comminuting or breaking up the mass into small particles or granules, substantially as described.

3. The method of preparing platinum for use at telephone-electrodes, which consists in taking a suitable quantity of platinum-black, mixing this with a rubber cement, drying the mass, subjecting it to the action of heat until the mass is brittle and non-elastic, and then comminuting or breaking up the mass into small particles or granules, substantially as described.

4. A substance for use at telephone-electrodes, comprising platinum-black in an agglomerate mass, substantially as described.

5. A substance for use at telephone-electrodes, comprising platinum-black in granular or free form, substantially as described.

In testimony whereof I affix my signature in presence of two witnesses.

DANIEL DRAWBAUGH.

Witnesses:
R. G. DYRENFORTH,
E. H. PARRY.